Dec. 8, 1964    V. C. MIRON    3,160,772
PLURAL VOLTAGE ELECTRIC GENERATOR
Filed Feb. 2, 1960
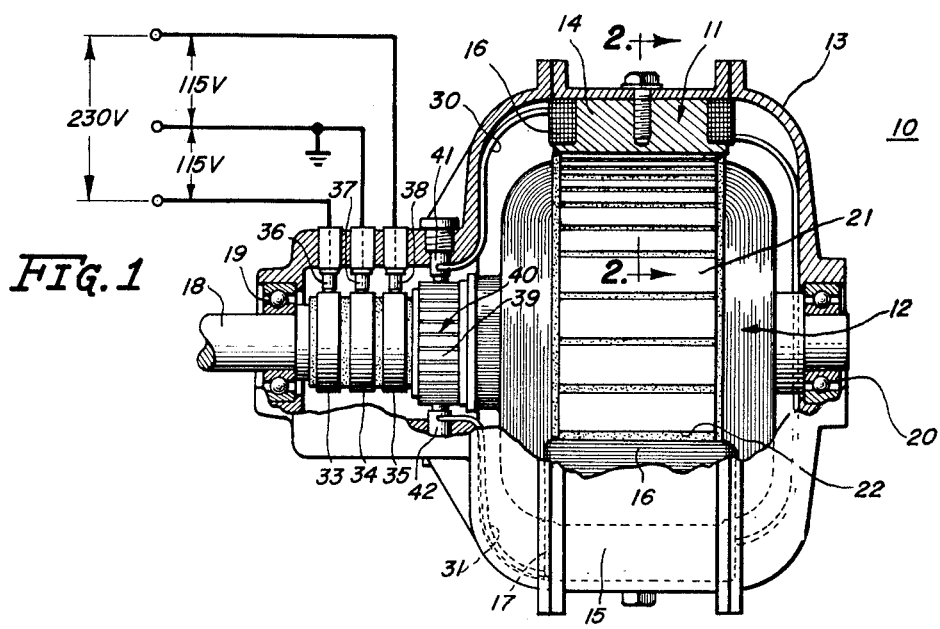
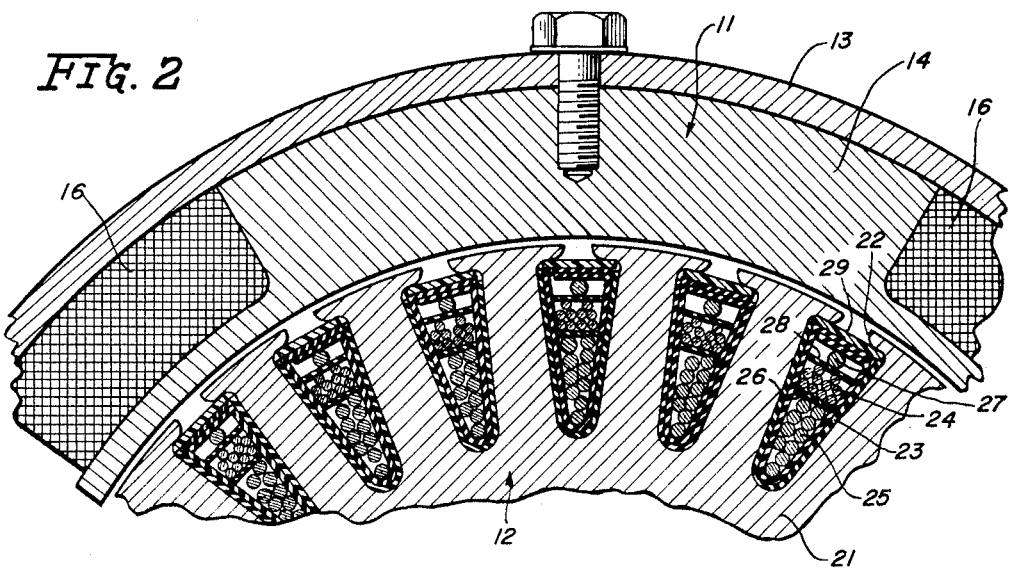
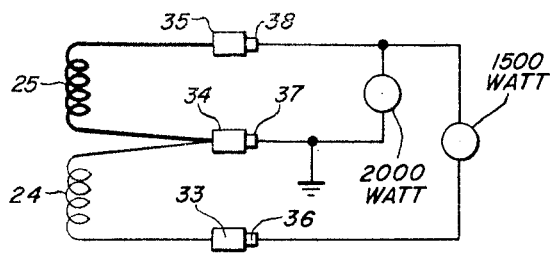

_United States Patent Office_

3,160,772
Patented Dec. 8, 1964

3,160,772
PLURAL VOLTAGE ELECTRIC GENERATOR
Vladimir C. Miron, deceased, late of Sioux City, Iowa, by The First National Bank in Sioux City, executor, Sioux City, Iowa, assignor to Wincharger Corporation, a corporation of Minnesota
Filed Feb. 2, 1960, Ser. No. 6,288
2 Claims. (Cl. 310—146)

This invention relates in general to electrical machines and in particular to a dual voltage electric current generator.

Normally the electrical power requirements of a given installation call for a single value of power-supply voltage and are satisfied by a source which develops only that value of line voltage and has sufficient power capacity. In certain applications, however, the load characteristics make it necessary to provide more than one value of power-supply voltage and even there, it is most desirable to employ a single source for satisfying the entire power requirements. To this end, it is conventional practice to use an electric current generator having two separate armature windings which are individually capable of generating power at one of the required line voltages and, when connected in series, collectively able to supply power at the other line voltage. For example, this is true of the ordinary 115/230 volt A.C. generator.

The output power available from an electrical generator at a specified terminal voltage is governed by a number of factors but principally by the current handling capacity of its armature windings. In the case of the conventional 115/230 volt generator, each of the two armature windings is constructed of substantially the same size conductor which is selected in relation to the maximum current to be drawn at 230 volts. The product of that current and 230 volts constitutes the maximum available output power of the machine at the higher voltage and that, of course, is twice the power from either winding individually at 115 volts. If the full power output of the generator is to be realized at 115 volts, two independent load circuits must be employed since each winding has a power capability of only one-half of the rated output of the generator. An obvious shortcoming of such prior machines is apparent when it is realized that 115 volt operation is limited to applications in which any one load circuit consumes no more than one-half of the rated generator output unless, of course, the two armature windings are connected in parallel. This expedient precludes concurrent 230 volt operation.

Moreover, for concurrent 115/230 volt operations, any 230 volt load further limits the maximum 115 volt load circuit to an even lesser value since the 230 volt load taxes each winding equally. For example, if the 230 volt load consumes one-half of the available generator power, then the maximum 115 volt load cannot be greater than one-half the rating of the individual windings. Accordingly, a full utilization of the available power output of prior dual voltage generators is realized only by judiciously tailoring individual loads.

It is therefore an object of the invention to provide a dual voltage electric current generator capable of delivering full power at either of its rated voltages or at combinations thereof.

It is a further object of the invention to provide an improved armature construction for dual voltage electric current generators.

It is another object of the invention to provide an improved electric current generator which overcomes the limitations of prior art devices.

In accordance with the invention a plural voltage electric current generator comprises a magnetic field structure for developing a magnetic flux field and a multi-winding armature structure positioned within the flux field of the magnetic structure. The armature includes a first winding formed of conductor turns having a predetermined current handling capacity and a second winding formed of conductor turns having a current handling capacity approximately twice that of the first winding. Means are provided for mounting the magnetic field and armature structures for relative rotary motion. The machine additionally includes three terminal connectors arranged with one pair providing a termination for the first winding and another pair providing a termination for the second winding.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

FIGURE 1 is a side view, partly in section, of an alternating current generator embodying the subject invention;

FIGURE 2 is a sectional view taken along line 2—2 of FIGURE 1; and

FIGURE 3 is a schematic representation of the armature windings and output circuit of the generator of FIGURE 1.

FIGURE 1 shows a plural voltage electrical machine, more particularly, a 115/230 volt alternating current generator 10 comprising a stationary magnetic field structure 11 and a multi-winding armature 12 positioned within the flux field of that structure. A housing 13 encloses the generator and supports the field structure which includes a pair of electromagnetic pole pieces 14, 15 encircled by the respective field windings 16, 17. Armature 12 is mounted upon a drive shaft 18 which, in turn, is axially journaled upon the end bearings 19, 20 and supports the armature for relative rotary motion with respect to field structure 11. Drive shaft 18 is coupled to a prime mover, not shown.

Referring now more particularly to FIGURE 2, the armature proper includes a core 21 having a plurality of slots 22 each provided with a liner of insulating material 23 for receiving the armature windings. In accordance with the invention, the multi-winding arrangement for the armature comprises a first winding 24 formed of conductor turns having a predetermined current handling capacity and a second winding 25, formed of substantially the same number of conductor turns, but having a current handling capacity at least approximately twice that of winding 24. In an embodiment of the invention which has been reduced to practice winding 25 is wound with wire two gauge numbers heavier than that of winding 24 and has a current handling capacity of twice the amperage of winding 24. As a result, the armature employs substantially the same amount of copper as a conventional dual voltage generator having the same power output rating.

Winding 25 is disposed in the bottom of slot 22 while winding 24 is positioned immediately above winding 25 and separated therefrom by a spacer 26 of insulating material. While it is not necessary to position winding 25 in the bottom of the slot, this arrangement is preferred since it affords maximum exposure of the heavy current winding to the walls of the enclosing core slots. As a result, the temperature rise of winding 25 is controlled since core 21 serves as a heat sink. Furthermore at such times as winding 25 is handling its maximum rated current, winding 24 is inactive and also serves to conduct heat from winding 25. Each slot also includes a direct current winding 27, preferably disposed above winding 24 and insulated therefrom by spacer 28. The positioning of winding 27 is likewise optional. A wedge 29, likewise of insulating material, rigidly secures the entire coil arrangement within the slot.

Interposed between end bearing 19 and armature core 21 are three terminal connectors comprising slip rings 33, 34 and 35 and their cooperating brushes 36, 37 and 38. The terminal connectors are so arranged that one pair of slip rings 33, 34 provide a termination for winding 24 while another pair, specifically slip rings 34, 35, provide a termination for winding 25.

Armature 12 further includes a commutator 40 having a plurality of conductor segments 39 individually connected to assigned turns of direct current winding 27. A pair of brushes 41, 42, which conductively engage oppositely disposed ones of commutator segments 39, are electrically connected to field coils 16, 17, respectively, by leads 30, 31.

Except for the armature windings, the construction of generator 10 is entirely conventional and, while the disclosed embodiment illustrates a machine having a stationary field structure and a rotating armature, it is to be understood that this particular arrangement in no way constitutes a limitation of the invention which is equally applicable to machines employing rotating magnetic field structures and stationary armatures.

The operation of the invention is best described by referring to FIGURE 3 in which the armature windings and a pair of representative load circuits are shown in schematic form. Winding 25 is represented by a heavy lined drawing in order to emphasize its greater current handling capacity. In operation, electromotive forces are generated in each of windings 24, 25 and 27 when armature 12 is rotated through the magnetic flux field by its prime mover. The output of winding 27 is rectified by commutator 40 and applied to field coils 16, 17 to establish a magnetic flux field in a conventional fashion. The electromotive forces generated in windings 24, 25 then provide 115 volt potentials between slip rings 33, 34 and 34, 35. For 115/230 volt operation, windings 24 and 25 are connected in series as shown in FIGURE 3 and their common point returned to a plane of reference potential.

Assume, for purposes of illustration, that a 1500 watt load is connected between terminal connectors 33, 35 and that a 2000 watt load is shunted across the 115 volt terminals 34, 35. The total current drawn by the 1500 watt load is approximately 6.55 amps., while the current required for the 2000 watt load is approximately 17.4 amps. Of course, the generator may supply loads of 115 volts exclusively or 230 volts exclusively as well as the combination shown in FIGURE 3. In fact, winding 25 alone is capable of delivering the full rated power of the generator for 115 volt applications.

Accordingly, the invention provides an electric generator having a novel armature construction which permits a full realization of the output power at either of two operating voltages. Moreover, this construction is amenable to combinations of load circuits requiring either or both available voltages which is a feature not realizable by prior dual voltage generators.

While a particular embodiment of the present invention has been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. A plural voltage electric generator having a predetermined maximum rated power output comprising: a magnetic field structure for developing a magnetic flux field; a multiwinding armature structure mounted for movement relative to said field structure and comprising first and second series connected windings; first, second and third load output terminals connected, respectively, to the free end of said first winding, a free end of said second winding, and the junction between said windings, said first winding being of wire of a predetermined cross-sectional area to have a current handling capacity sufficient to deliver, together with said second winding, said maximum rated power at a first voltage to a load connected between said first and second terminals, and said second winding being of wire of a cross-sectional area larger than said predetermined area to have a current handling capacity sufficient to deliver said maximum rated power at a second voltage lower than said first voltage to a load connected between said second and third terminals.

2. A plural voltage electric generator having a predetermined maximum rated power output comprising: a magnetic field structure for developing a magnetic flux field; a multiwinding armature structure mounted for movement relative to said field structure and comprising first and second series connected windings; first, second and third load output terminals connected, respectively, to the free end of said first winding, a free end of said second winding, and the junction between said windings, said first winding being of wire of a predetermined cross-sectional area to have a current handling capacity sufficient to deliver, together with said second winding, said maximum rated power at a first voltage to a load connected between said first and second terminals, and said second winding being of wire of a cross-sectional area larger than said predetermined area to have a current handling capacity approximately twice that of said first winding for delivering said maximum rated power at a second voltage approximately one-half that of said first voltage to a load connected between said second and third terminal.

References Cited in the file of this patent

UNITED STATES PATENTS

| | | |
|---|---|---|
| 556,865 | Rice | Mar. 24, 1896 |
| 587,164 | Rushmore | July 27, 1897 |
| 781,968 | Sachs | Feb. 7, 1905 |
| 1,430,130 | Warder | Sept. 26, 1922 |
| 1,861,262 | Chesney | May 31, 1932 |
| 2,898,542 | Wasko | Apr. 4, 1959 |